US008346579B1

(12) United States Patent
Solis et al.

(10) Patent No.: US 8,346,579 B1
(45) Date of Patent: *Jan. 1, 2013

(54) SYSTEMS AND METHODS FOR SUPPORTING EXTENDED PAY DATE OPTIONS ON AN INSURANCE POLICY

(75) Inventors: Alex Solis, San Antonio, TX (US); Jeff Dennes, San Antonio, TX (US); Carl G. Loyd, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,139

(22) Filed: Feb. 23, 2012

Related U.S. Application Data

(63) Continuation of application No. 12/891,400, filed on Sep. 27, 2010, now Pat. No. 8,145,564, which is a continuation of application No. 11/513,443, filed on Aug. 30, 2006, now Pat. No. 7,814,006.

(51) Int. Cl.
*G06Q 40/00* (2012.01)
(52) U.S. Cl. .................. 705/4; 705/35; 705/38
(58) Field of Classification Search .......... None
See application file for complete search history.

(56) References Cited

U.S. PATENT DOCUMENTS

| | | | |
|---|---|---|---|
| 7,809,588 B1 | 10/2010 | Solis et al. | |
| 7,809,589 B1 | 10/2010 | Solis et al. | |
| 7,814,006 B1 | 10/2010 | Solis et al. | |
| 8,145,564 B1 | 3/2012 | Solis et al. | |
| 2003/0101131 A1 | 5/2003 | Warren et al. | |

OTHER PUBLICATIONS

"U.S. Appl. No. 11/513,443, 312 Amendment filed Sep. 1, 2010", 3 pgs.
"U.S. Appl. No. 11/513,443, Non Final Office Action mailed Oct. 8, 2009", 5 pgs.
"U.S. Appl. No. 11/513,443, Notice of Allowance mailed Jul. 1, 2010", 12 pgs.
"U.S. Appl. No. 11/513,443, PTO Response to 312 Amendment mailed Sep. 14, 2010", 2 pgs.
"U.S. Appl. No. 11/513,443, Response filed Apr. 8, 2010 to Non Final Office Action mailed Oct. 8, 2009", 7 pgs.
"U.S. Appl. No. 11/513,592, 312 Amendment filed Jul. 14, 2010", 3 pgs.
"U.S. Appl. No. 11/513,592, Non Final Office Action mailed Oct. 7, 2009", 5 pgs.
"U.S. Appl. No. 11/513,592, Notice of Allowance mailed Jun. 30, 2010", 12 pgs.
"U.S. Appl. No. 11/513,592, PTO Response to 312 Amendment mailed Sep. 13, 2010", 2 pgs.
"U.S. Appl. No. 11/513,592, Response filed Apr. 7, 2010 to Non Final Office Action mailed Oct. 7, 2009", 3 pgs.
"U.S. Appl. No. 11/513,593, Examiner Interview Summary filed Feb. 1, 2010", 1 pg.

(Continued)

*Primary Examiner* — Jason M Borlinghaus
(74) *Attorney, Agent, or Firm* — Schwegman Lundberg Woessner P.A.

(57) ABSTRACT

A recurring automatic payment date may be set for an insurance policy premium based on customer preference. A server may receive a customer-specified day of a month and/or a request for bimonthly withdrawals, such as may be entered via a user interface on an insurance company webpage. The customer specified day(s) may be analyzed against data associated with the insurance policies to determine whether the day is disallowed. The day may be disallowed, for example, because it would result in falling behind an earned premium curve and thereby require a double bill or short bill to stay ahead of the earned premium curve.

21 Claims, 9 Drawing Sheets

OTHER PUBLICATIONS

"U.S. Appl. No. 11/513,593, Examiner Interview Summary mailed Oct. 20, 2009", 4 pgs.

"U.S. Appl. No. 11/513,593, Non Final Office Action mailed Jun. 9, 2009", 12 pgs.

"U.S. Appl. No. 11/513,593, Notice of Allowance mailed May 18, 2010", 9 pgs.

"U.S. Appl. No. 11/513,593, Notice of Allowance mailed Dec. 31, 2009", 16 pgs.

"U.S. Appl. No. 11/513,593, Response filed Oct. 9, 2009 to Non Final Office Action mailed Jun. 9, 2009", 19 pgs.

"U.S. Appl. No. 11/513,595, Non Final Office Action mailed Jun. 10, 2009", 12 pgs.

"U.S. Appl. No. 11/513,689, Non Final Office Action mailed Jun. 10, 2009", 12 pgs.

"U.S. Appl. No. 12/891,400, Ex Parte Quayle mailed Oct. 19, 2011", 4 pgs.

"U.S. Appl. No. 12/891,400, Non Final Office Action mailed Mar. 31, 2011", 7 pgs.

"U.S. Appl. No. 12/891,400, Preliminary Amendment filed Sep. 27, 2010", 2 pgs.

"U.S. Appl. No. 12/891,400, Response filed Jun. 30, 2011 to Non Final Office Action mailed Mar. 31, 2011", 14 pgs.

"U.S. Appl. No. 12/891,400, Response to Rule 312 Communication mailed Feb. 27, 2012", 2 pgs.

"U.S. Appl. No. 12/891,400, Notice of Allowance mailed Nov. 15, 2011", 8 pgs.

"Billing FAQs—Automated Funds Transfer", American Family Insurance, [Online]. Retrieved from the Internet: <URL: http://www.amfam.com/billing/faq_aft.asp>, (Jun. 28, 2006), 3 pgs.

"EBilling", Geico, [Online]. Retrieved from the Internet: <URL: https://mypolicy.geico.com/phsapp/fileviewerdo?file=documents.faq#whatiseb>, (Jul. 27, 2006), 1 pg.

"eService FAQs: Billing", Metropolitan Life Insurance Company, MetLife, [Online]. Retrieved from the Internet: <URL: http://www.metlife.com/Applications/Corporate/WPS/CDA/PageGenerator/0,4132,P4185,00.html>, (Jul. 28, 2006), 3 pgs.

"Policyholder Service Center", Geico, [Online]. Retrieved from the Internet: <URL: https://mypolicy.geico.com/phsapp/rpppinfo.do>, (Jul. 27, 2006), 2 pgs.

Vaughan, Emmet J., et al., "", Fundamentals of Risk and Insurance, 9th Edition, John Wiley & Sons, (2003), 221-225.

400

Automatic Payment Plan: Selection — 401

This Automatic Payment Plan will be applied toward insurance policy [xxxxxxxxxxx]

Member name: John Q. Member
Member number: 1234567

Select a Payment Date Option: — 402

| Payment Date Option | ○ Semi-monthly: 1st and 15th — 403 |
| --- | --- |
| 404 | ○ Specific settlement day [ ] 01 through 31 |
| 405 | |

Withdraw Payments From — 406

407 ○ Bank Account 1
408 ○ Bank Account 2
409 ○ Other Account
Please enter account information below. — 410

[            ]

Next  411

Automatic Payment Plan: Selection — 401

This Automatic Payment Plan will be applied toward insurance policy [xxxxxxxxxxx]

The day entered is not available. In order to comply with billing rules, please select from one of the following suggested day(s): [$1^{st}$, $15^{th}$, or $31^{st}$] — 501

[ Explanation ] — 502

Member name: John Q. Member
Member number: 1234567

Select a Payment Date Option: — 402

Payment Date Option — 404
○ Semi-monthly: $1^{st}$ and $15^{th}$ — 403
○ Specific settlement day [ ] 01 through 31 — 405

Withdraw Payments From — 406

407 — ○ Bank Account 1
408 — ○ Bank Account 2
409 — ○ Other Account
Please enter account information below. — 410

[                    ]

[ Next  411 ]

Automatic Payment Plan: Verification

Member name: John Q. Member
Member number: 1234567

Arrangement for Future Bills — 601

| | |
|---|---|
| Payment plan: | [Plan name] |
| Pay date option: | [Specific settlement day(s) / bimonthly] |
| Settlement day: | [23rd] |
| Withdraw payments from: | [Bank Account 1] |
| First payment date: | [09/23/2010] |

Future Settlement Dates — 602

| | | |
|---|---|---|
| Oct. 22, 2010 | Feb. 23, 2011 | Jun. 21, 2011 |
| Nov. 23, 2010 | Mar. 24, 2011 | Jul. 23, 2011 |
| Dec. 24, 2010 | Apr. 22, 2011 | Aug. 22, 2011 — 603 |
| Jan. 20, 2011 | May 23, 2011 | Sep. 23, 2011 |

Back 604 | Next 411

Automatic Payment Plan: Confirmation    805

Please print this page for your records.

Member name: John Q. Member         John Q. Member signed on
Member number: 1234567              Sep. 16, 2005 at 11: 47 AM CT

Arrangement for Future Bills          801

| | |
|---|---|
| Payment plan: | [Plan name] |
| Pay date option: | [Specific settlement day(s) / bimonthly] |
| Settlement day: | [23$^{rd}$] |
| Withdraw payments from: | [Bank Account 1] |
| First payment date: | [09/23/2010] |

Future Settlement Dates              802

| | | |
|---|---|---|
| Oct. 22, 2010 | Feb. 23, 2011 | Jun. 21, 2011 |
| Nov. 23, 2010 | Mar. 24, 2011 | Jul. 23, 2011 |
| Dec. 24, 2010 | Apr. 22, 2011 | Aug. 22, 2011 |
| Jan. 20, 2011 | May 23, 2011 | Sep. 23, 2011 |

SYSTEMS AND METHODS FOR SUPPORTING EXTENDED PAY DATE OPTIONS ON AN INSURANCE POLICY

CROSS-REFERENCE TO RELATED APPLICATIONS

This application is a continuation of and claims the benefit of priority under 35 U.S.C. §120 to U.S. patent application Ser. No. 12/891,400, entitled "SYSTEMS AND METHODS FOR SUPPORTING EXTENDED PAY DATE OPTIONS ON AN INSURANCE POLICY," filed on Sep. 27, 2010, which is a continuation of and claims the benefit of priority under 35 U.S.C. §120 to U.S. patent application Ser. No. 11/513,443, entitled "SYSTEMS AND METHODS FOR SUPPORTING EXTENDED PAY DATE OPTIONS ON AN INSURANCE POLICY," filed on Aug. 30, 2006, and is related to U.S. patent application Ser. No. 11/513,592, U.S. patent application Ser. No. 11/513,593, U.S. patent application Ser. No. 11/513,689, and U.S. patent application Ser. No. 11/513,595, all of which were filed on Aug. 30, 2006, and also are entitled "SYSTEMS AND METHODS FOR SUPPORTING EXTENDED PAY DATE OPTIONS ON AN INSURANCE POLICY," and all of which are hereby incorporated by reference herein in their entirety.

BACKGROUND

One aspect of supplying insurance coverage in return for the payment of insurance policy premiums is the advantageous potential of staying ahead of the earned premium curve. In general, this refers to collecting payments for an insurance policy prior to incurring the risk associated with supplying the insurance coverage. For example, if an insurance policy is effective for sixth months, from July through December, then to stay ahead of the earned premium curve an insurance company might collect payments on the $20^{th}$ of each month, starting in June and ending in November. Conversely, collecting payments on the $20^{th}$ of each month, starting in July and ending in December, would place a company behind the earned premium curve, because risk would be carried each month prior to the customer's payment of the premium.

When a customer first purchases an insurance policy, he or she may be given a grace period prior to receiving the first bill. Thus, at the time of the first bill, the insurance company is behind the earned premium curve, and must generally find a way to subsequently shift its position to get ahead of the earned premium curve while still providing good customer service and not confusing the customer or otherwise giving the customer the impression that he is being overcharged.

To shift position and get ahead of the earned premium curve, insurance companies may conduct either a "short bill" or a "double bill" procedure during the first insurance policy coverage period. In a "short bill" approach, the number of payments during the coverage period are reduced, while the amount of such payments is increased. For example, on a six-month policy, the customer may be asked to make five larger payments, starting during the first month of the policy and ending in the second to last month, instead of six smaller payments (starting during the first month and ending in the last month). By the time the customer pays the last of the five payments, the insurance company has received full payment for the policy and is ahead of the curve. If the policy is renewed, the customer can be billed starting before the next coverage period, and can switch to a six payment billing arrangement.

In a "double bill" arrangement, the customer may be billed twice during one of the billing cycles. The customer thus pays, for example, six monthly payments on a six month policy, however during one of the months the customer is asked to make two of the six payments so that by the end of the policy, the insurance company is ahead of the earned premium curve. Once again, by the time the customer pays the last of the payments, the insurance company has received full payment for the policy and is ahead of the curve. If the policy is renewed, the customer can be billed starting before the next coverage period, and need not be doubled billed again.

Both of the above solutions are adequate, but come at the cost of possible misunderstandings with insurance company customers. Such misunderstandings present a cost in terms of lost customers and increased customer service costs. The need to double bill or short bill should thus be minimized to the extent possible.

Meanwhile, customers increasingly ask for and expect flexibility in terms of when a recurring payment will be withdrawn from a customer bank account. Many customers receive bi-weekly or monthly paychecks from work or other funding sources, and like to have automatic withdrawals made at a time when they can be sure there will be adequate funds in their account. However, it will be appreciated from the above that changing a date of automatic withdrawal is not as straightforward as it may seem. In addition to the need to stay ahead of an earned premium curve, automatic withdrawals from bank accounts are regulated and must be done in accordance with applicable rules and procedures. For example, the National Automated Clearing House Association (NACHA) presently provides a 10 day mandatory notice period. A variety of additional factors introduce complexity to the proposition of allowing customers flexibility in setting their own automatic withdrawal dates. For example, a large insurance company may prefer to spread withdrawals more or less evenly, rather than have a large number of withdrawals on a particular day of the month.

In consideration of the above problems in the industry, it is desirable to provide systems and methods for supporting extended pay date options on an insurance policy, allowing customers flexibility in selecting their own pay dates without violating automatic withdrawal notice requirements, falling behind an earned premium curve, or incurring a variety of other difficulties that may result from supplying customers with such flexibility.

SUMMARY

In consideration of the above-identified shortcomings of the art, the present disclosure provides systems and methods for supporting extended pay date options on an insurance policy. In general, contemplated methods and apparatus may set a recurring automatic payment date for an insurance policy premium based on customer preference. In a internet-based implementation, a server may receive a customer-specified day of a month and/or a request for bimonthly withdrawals, such as may be entered via a user interface on an insurance company webpage. At least one insurance policy associated with the customer may be identified—in one embodiment, all of the customer's insurance accounts may be identified whether auto insurance, home insurance, life insurance, or otherwise. The customer specified day(s) may be analyzed against data associated with the insurance policies to determine whether the day is disallowed. The day may be disallowed, for example, because it would result in falling behind an earned premium curve and thereby require a double bill or short bill to stay ahead of the earned premium curve.

Alternatively, a day could be disallowed because it would require a notice period that is shorter than a mandatory notice period for notifying a customer of a pending withdrawal from a customer bank account, or could further be disallowed for any combination of reasons as set forth in detail herein. Additional advantages and features of the invention are described below.

BRIEF DESCRIPTION OF THE DRAWINGS

The systems and methods for supporting extended pay date options on an insurance policy in accordance with the present disclosure are further described with reference to the accompanying drawings in which:

FIG. 4 illustrates an exemplary user interface for receiving a customer specified day for recurring automatic payments on an insurance policy.

FIG. 5 illustrates an exemplary user interface for suggesting alternate dates to a customer in the event that a customer specified day is disallowed.

FIG. 6 illustrates an exemplary user interface for displaying a plurality of precomputed withdrawal dates from a customer bank account.

FIG. 8 illustrates an exemplary user interface for displaying a plurality of precomputed withdrawal dates from a customer bank account in a confirmation page—confirming for the customer that the selected days are allowable.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In general, the below description begins with exemplary methods and user interfaces that may be implemented in accordance with embodiments of the invention. Thereafter, computer hardware, software, and networking components are described that may be used to implement such methods and user interfaces, or to provide system and computer readable media embodiments the invention.

Figure 1:
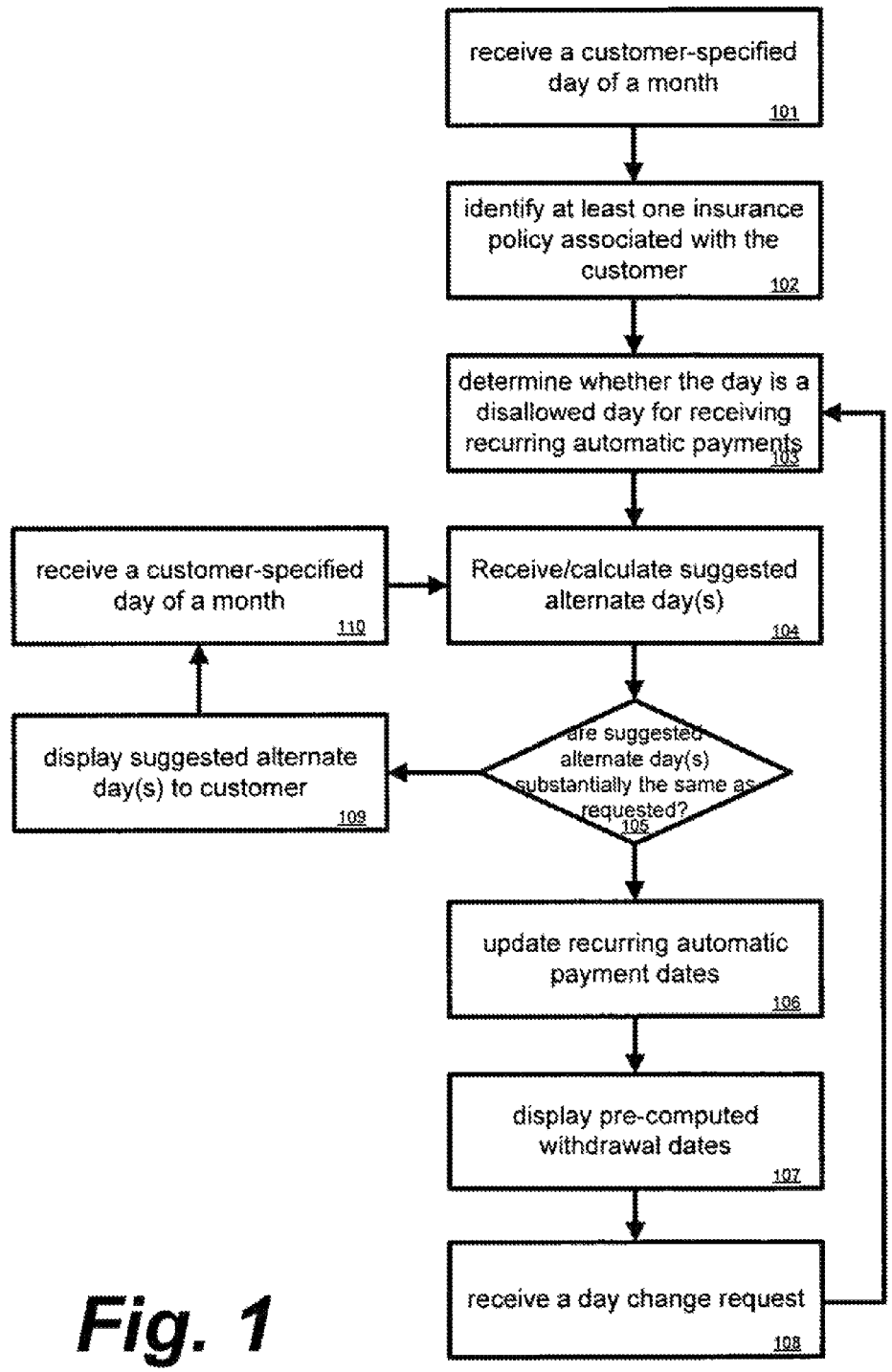
FIG. 1 illustrates a method generally comprising receiving a customer specified day, determining whether the day is disallowed, and updating recurring automatic payment dates.

FIG. 1 illustrates a method generally comprising receiving a customer specified day, determining whether the day is disallowed, and updating recurring automatic payment dates. FIG. 1 thus provides one exemplary embodiment of a computer-implemented method for setting a recurring automatic payment date for an insurance policy premium. The method begins with receiving a customer-specified day of a recurring billing cycle 101, such as a month. The recurring billing cycle might also be a week, a year, every two weeks, every two months, or another recurring period of time. In the case of a monthly recurring billing cycle, the customer might indicate, for example, that he wishes to be billed on the $23^{rd}$ day of each month. In one embodiment, the customer enters this information in a web page interface, and thereafter transmits the information to an insurance company server equipped with an appropriate component for receiving the information. Those of skill in the art will appreciate that the customer might also use a telephone, cell phone, Personal Digital Assistant (PDA) or other electronic device to transmit information that is ultimately received by an insurance company server.

The insurance company server and/or other electronics may next identify at least one insurance policy associated with said customer 102. The customer may have multiple insurance policies such as auto, home, property, life, and so forth. In one embodiment, the customer may select a particular policy for which he wishes to set a specific pay date. In another embodiment, the customer's selected pay date may be applied to all of the customer's policies with the subject insurance company. Applying a customer's selected pay date to more than one insurance policy requires additional computation of disallowed days for any additional policies, thereby adding complexity to such embodiments but also providing increased utility for the customer because the customer may set a single pay date for all of his insurance policies at once. Alternatively, in certain markets, customers may wish to stagger payments, in which case an ability to set pay dates on a policy-by-policy basis may be preferable.

Figure 3:
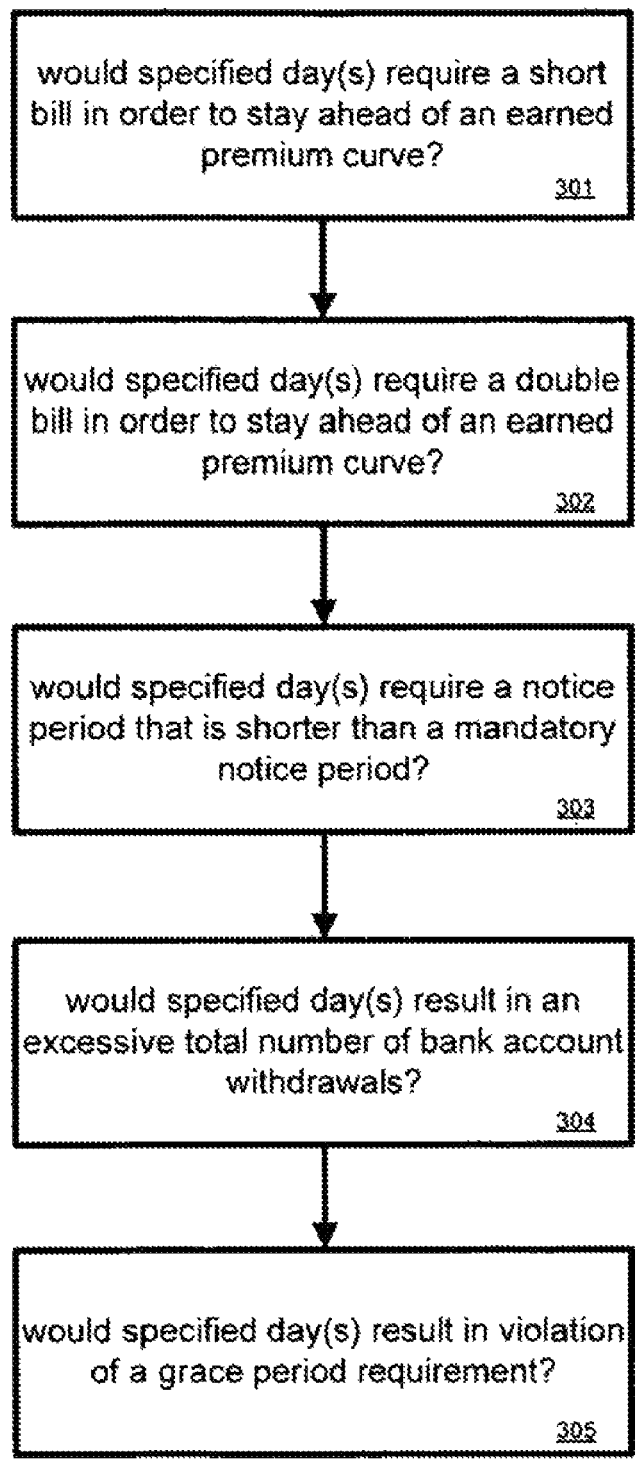
FIG. 3 illustrates an exemplary algorithm for determining whether a particular day is disallowed.

Step 103 comprises determining whether the customer-selected day is a disallowed day for receiving recurring automatic payments. This step can involve a variety of computations as illustrated in FIG. 3. FIG. 3 provides a number of computational steps that may be performed individually or in combination in various embodiments of the invention. Each of the computational steps provided in FIG. 3 may generate a result that comprises a decision, based on the implemented logic of the step, that the selected day is allowed. Each of the computational steps provided in FIG. 3 may also generate a result that comprises a decision, based on the implemented logic of the step, that the selected day is disallowed. Finally, each of the computational steps provided in FIG. 3 may further generate a result that comprises one or more suggested alternate days, based on the implemented logic of the step.

Exemplary steps provided in FIG. 3 are, first, would the specified day(s) require a short bill in order to stay ahead of an earned premium curve 301. This step can be implemented using logic based on an insurance company's internal operating policies that govern when a short bill must be used to place the company in a position that is ahead of an earned premium curve. The step may look at, for example, each of the recurring withdrawal dates associated with the customer specified day. For example, in a monthly recurring bill scenario, the logic may analyze the customer's specified day, e.g., the $23^{rd}$ of each month, for each month for the duration of the entire insurance policy. If none of the days would result in falling behind the earned premium curve in such a way as to require a short bill, the logic may generate a result that the day is allowed.

If some of the specified days would require a short bill, then the logic of 301 may determine whether alternate days are available that are substantially the same as requested, but that would not require a short bill. Exemplary steps of such logic are similar to the steps 104 and 105 as illustrated in FIG. 1. First, a plurality of alternate days may be calculated as necessary, as in step 104, by examining the customer specified dates, acceptable days with regard to the company's earned premium curve, and optionally at the company's short bill requirements. The calculated alternate dates will be those that will not require a short bill in order to return to a position that is ahead of an earned premium curve.

Next, as in step 105, it can be determined whether the alternate days are substantially the same as requested. In one embodiment, this may be accomplished by comparing calculated alternate dates to a threshold level of acceptable difference between the customer-specified days and the alternate days. The threshold level may be determined and input into the system, for example by a technician in charge of the software. For example, it might be determined that it is generally acceptable to vary customer specified days for up to three bills by a maximum amount of 3 days. Anything beyond this amount of variation could be considered to require separate customer approval prior to settling on an agreed recurring automatic payment date.

Thus, in one embodiment, a step such as 301 may generate one of three outputs: allowed, allowed with certain suggested alternate dates that are substantially similar to the requested dates, and disallowed with certain suggested alternate dates that are not considered substantially similar to the requested dates. As stated above, in one embodiment the determination of whether the alternate dates are substantially similar can be made by comparing the suggested dates to a threshold level of acceptable difference.

The same approach may be applied, as necessary, to any of the other steps illustrated in FIG. 3. Step 302 determines whether specified days would require a double bill in order to stay ahead of an earned premium curve. This can be determined by examining the customer specified dates against acceptable days with regard to the company's earned premium curve and optionally at the acceptable dates under the company's double bill requirements. Once again, alternate dates can be calculated and compared to a threshold to ultimately decide whether the customer specified day is allowed or disallowed, along with any suggested alternate dates in both scenarios.

Step 303 determines whether specified days would require a notice period that is shorter than a mandatory notice period. Banking and electronic banking in particular is regulated by a variety of governmental and industry regulations that require notice to a bank account holder. For example, the National Automated Clearing House Association (NACHA) presently requires a mandatory notice period of 10 days prior to making an electronic withdrawal of funds from a bank account. The customer must thus be "billed" at least 10 days prior to the date of withdrawal, also referred to as a settlement date. The bill thus serves the purpose of notifying the customer of an upcoming electronic withdrawal from a bank account. It is contemplated that NACHA notice periods may change over time, and additional or different notice periods may supplement or take the place of the 10 day notice requirement. The invention is not limited to the NACHA notice period, and it should be appreciated that embodiments may account for additional requirements as they arise.

A determination in step 303 can be made by determining whether the customer specified day falls on any day that would require a notice period that is shorter than a mandatory notice period for notifying a customer of a pending withdrawal from a customer bank account. The term "bank account" should be distinguished from "credit card," as the credit card industry is subject to different regulations than banking institutions. Similar to steps 301 and 302, alternate dates can be calculated and compared to a threshold to ultimately decide whether the customer specified day is allowed or disallowed, along with any suggested alternate dates in both the "allowed" and "disallowed" scenarios.

Step 304 determines whether specified day(s) result in an excessive total number of bank account withdrawals. A large insurance company may have tens of thousands, hundreds of thousands, or even millions of customers or members. This results in a large amount of withdrawals from customer bank accounts, and it can be expedient to spread such withdrawals out so that they are not all concentrated on a single day or small subset of days of the month (the term "month" should be considered as representative of recurring billing period, regardless of the applicable period).

In consideration of the desire to spread withdrawals out, a step such as 304 may be performed by determining whether specified days would require an excessive total number of bank account withdrawals on any of the days a recurring bill may fall by comparing the requested days against company wide data for the number of withdrawals on those days. Again, alternate dates can be calculated and compared to a threshold to ultimately decide whether the customer specified day is allowed or disallowed, along with any suggested alternate dates in both scenarios.

Step 305 determines whether the specified days would result in a violation of a grace period requirement. A grace period requirement is a period during which, by company policy or by externally mandated regulation, a customer may not be billed. Step 305 can compare the customer specified days against days that are considered disallowed due to falling within a grace period. Alternate dates can be calculated and compared to a threshold to ultimately decide whether the customer specified day is allowed or disallowed, along with any suggested alternate dates in both scenarios.

When performed in combination, in one embodiment the results from steps 301-305 may be passed from one step to the next, so that each step may operate intelligently based on the results of the previous steps. As suggested above, each step 301-305 may also be performed multiple times to account for multiple customer insurance policies. Alternatively, some pre-processing may be performed to allow steps 301-305 to account for multiple policies in a single pass. Embodiments that adjust payment dates for multiple insurance policies may account for differing effective dates of various insurance policies, as well as the other factors described above.

Returning to FIG. 1, step 104 may be performed based on the results of any steps performed pursuant to FIG. 3. The method of FIG. 1 may receive any suggested alternate day(s) as calculated in steps 301-305. If the alternate days are substantially similar or otherwise flagged as allowable in step 105, then the customer's recurring automatic payment dates can be updated in step 106. However, if the alternate days are not substantially similar, or flagged as disallowed in step 105, then suggested alternated day(s) may be displayed to the customer for approval in step 109. The customer may re-enter or otherwise select one or more of the alternate days, causing the server to again receive a customer specified day of the month in step 110. Once again, a set of alternate days are calculated as necessary in step 104, and it can be verified whether the alternate days are substantially similar in step 105.

Step 106 may be preceded, if desired by a verification step in which the customer-specified withdrawal dates, as modified by any alternate dates that may occur at various times during the insurance policy, are displayed to the customer for verification and approval. In such an embodiment, the customer's automatic payments are updated only after verification by the customer.

Both a verification step and/or an update confirmation step may display pre-computed withdrawal dates to the customer 107, for example by transmitting a webpage including the pre-computed withdrawal dates to a client computing device. In one embodiment, all of the withdrawal dates for the duration of the insurance policy may be displayed. In another embodiment, the number of withdrawal dates may be limited, for example, to the total number of withdrawals that will occur during a one-year period.

In another embodiment, the pre-computed withdrawal dates displayed in 107 may be hyplerlinked to allow a customer to select individual dates for modification. For example, if the customer wanted to make withdrawals on the $23^{rd}$ of each month, but one of the months was assigned an alternate date of the $21^{st}$, and the customer receives his paycheck on the $22^{nd}$, then the customer may want to see if other alternate dates are possible that month. A plurality of acceptable alternate dates may be transmitted to the customer, and the customer may submit a day change request that is received in step 108. The day change request may be routed back through the steps of the method in FIG. 1, e.g., starting with step 103, to properly ensure that the day is allowed and to update the specific withdrawal day.

Figure 2:
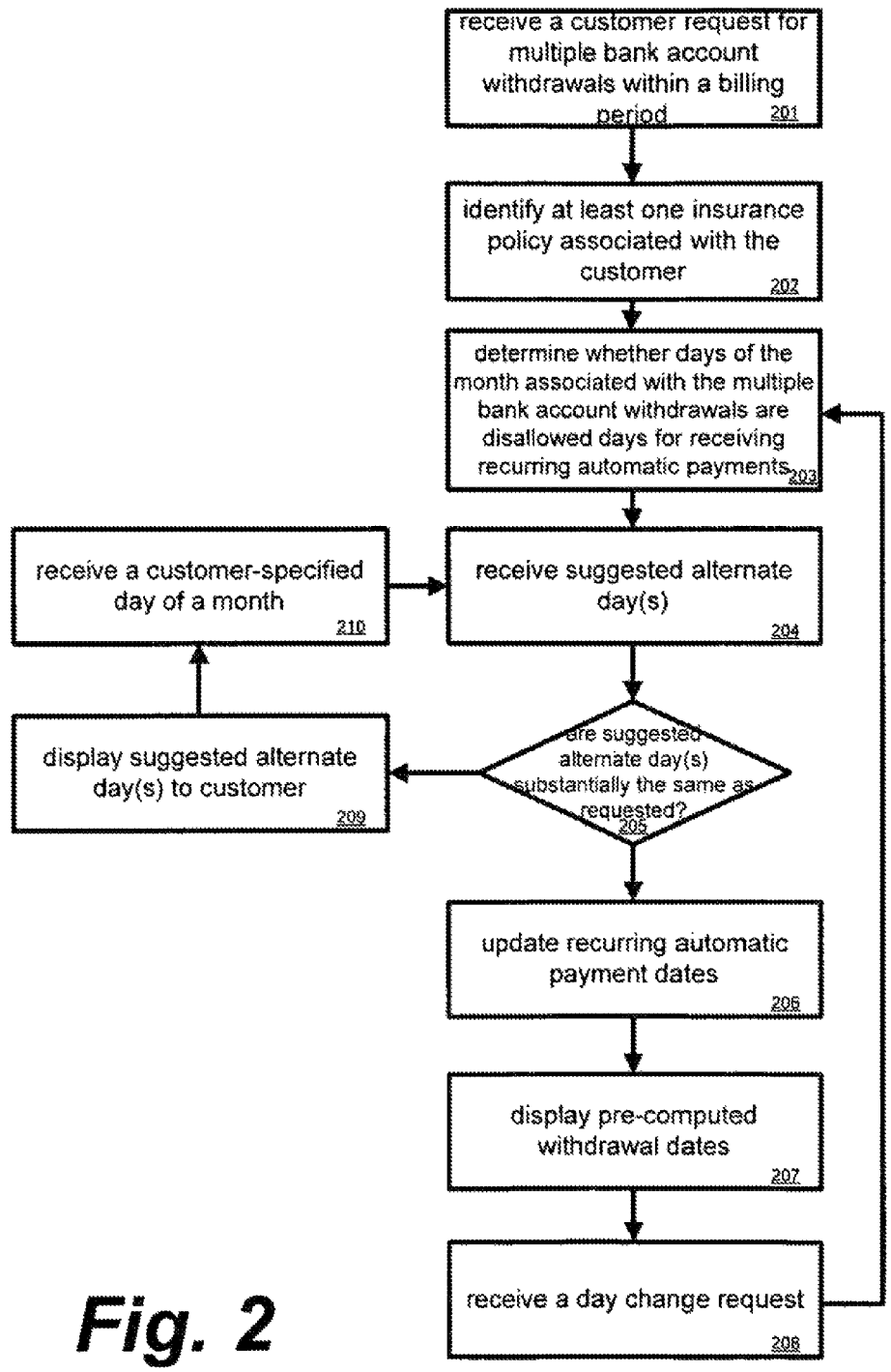
FIG. 2 illustrates a method generally comprising receiving a customer request for multiple bank account withdrawals within a billing period, determining whether the days associated with the withdrawals are disallowed, and updating recurring automatic payment dates.

FIG. 2 presents a method that is similar in most aspects to the method of FIG. 1, but is designed for a situation in which a customer requests multiple bank account withdrawals during a billing period. In one scenario, an insurance policy may have a one-month billing period, while a customer may receive a paycheck twice a month and may correspondingly wish for withdrawal to be made twice a month. This is a common situation in the enlisted insurance market comprising individuals and families enlisted in the United States military, and providing such an option is considered preferable in serving this market.

A customer may be given the option to set his own multiple withdrawal dates, or may be constrained to preset dates, such as the $1^{st}$ and $15^{th}$ of the month. In either case, the customer request for multiple bank account withdrawals within a billing period is received at the server 201. As with FIG. 1, insurance policies associated with the customer may be identified 202. Here, the determination in step 203 is made with respect to the multiple days within a billing period requested by the customer instead of the single day within the billing period, thereby adding a layer of computational complexity. As with FIG. 1, the customer specified days can be determined to be allowed or disallowed according to FIG. 3. The remainder of the method illustrated in FIG. 2, including steps 204-210, can be performed in substantially the same way as described with respect to FIG. 1.

FIGS. 4-8 illustrate an exemplary user interfaces in accordance with aspects of the invention. The various aspects of these figures may be transmitted by a server, such as a web server at an insurance company, to a client device operated by a customer. As such, systems in accordance with the invention may comprise one or more components for generating and transmitting information to a client device, and for receiving information from the client device that is displaying the insurance company user interfaces. Such servers may further comprise supporting logic such as logic for performing the methods of FIGS. 1-3, where selected results from such logic are presented via the user interfaces of FIGS. 4-8.

FIG. 4 illustrates an exemplary user interface 400 for receiving a customer specified day for recurring automatic payments on an insurance policy. FIG. 4 thus represents an output of a computer-implemented method for setting a recurring automatic payment date for an insurance policy premium. Such a method may comprise, for example, transmitting first information for display on a user interface 400, the first information comprising at least one identifier 401 for an insurance policy associated with a customer. It should be appreciated that the identifier 401 may be a single identifier associated with a single insurance policy, a family identifier associated with a plurality of insurance policies, or a plurality of identifiers associated with a corresponding plurality of policies. The identified insurance policy is payable by recurring automatic withdrawals from a customer bank account.

A bank account selection component 406 may thus accompany the various other elements of 400. The bank account selection component 406 may comprise, for example, selection buttons 407-409 for selecting from a plurality of customer bank accounts, or for selecting a new bank account, the requisite information for which may be entered via a bank account identification component 410.

A second information transmitted for display on said user interface 400 may comprise a customer date entry interface 402 for entry of a customer-specified day of a month for said recurring automatic withdrawals. In the illustrated embodiment, interface 402 comprises a selectable option to perform multiple bank account withdrawals within a billing period 404, and an option to select a specific settlement day 405 by entering a date into a component such as 403. Having entered information into the various fields of 400, the customer may select a button such as 411 which triggers transmission of the customer specified information from the client device to the server, such that the information is received at the server for further processing and optionally transmitting additional information to the client.

FIG. 5 illustrates an exemplary user interface 500 for suggesting alternate dates to a customer in the event that a customer specified day is disallowed. In response to receiving a customer-specified day of a month for recurring automatic withdrawals, as specified in FIG. 4, the insurance company server may follow methods such as those of FIG. 1 or FIG. 2 to determine whether the day is a disallowed day for receiving recurring automatic payments for the identified insurance policy. Determining disallowed days may be done according to the description of FIG. 3 provided herein.

If it is determined that the customer specified day will be considered disallowed, then a user interface such as 500 may be transmitted to the customer. This user interface may, in one embodiment, have many of the same elements as FIG. 4, in addition to any suggested alternate days 502, and optionally an explanation 502 for why the initial customer specified day was disallowed. It should be noted that different implementations may be preferable two scenarios: first, when communicating with a customer directly and second, when communicating with an agent who, for example, may be talking to the customer on a telephone or who otherwise represents the customer's desires. In some situations it may be preferable to provide an explanation 502 to an agent, but not to a customer. This is because the concept of earned premium curve and so forth is complicated and difficult to explain to the average customer.

FIG. 6 illustrates an exemplary user interface 600 for displaying a plurality of precomputed withdrawal dates from a customer bank account. Information that is transmitted to form a user interface such as 600 may comprise insurance policy and bank account information 601, and may further comprise a plurality of precomputed withdrawal dates from a customer bank account 602. Notice that the precomputed withdrawal dates need not all fall on the exact day that the customer specified. Where the customer specified, for example, the 23$^{rd}$ of the month, the withdrawal dates may fall on dates that are considered substantially similar to the specified date, which may include, for example, any date from the 20$^{th}$ to the 25$^{th}$. In FIG. 6, at least one of the precomputed withdrawal dates in 601 does not fall on the customer-specified day of a month—here, the 23$^{th}$—but instead falls on a day immediately before or immediately after the precomputed withdrawal date, or even two or three days before or after as may be configured in some embodiments. The alternate days in 601 may be determined via the methods presented in FIG. 3.

The user interface 600 is termed a "verification" page because it gives the customer an opportunity to verify the dates 602 prior to updating their actual withdrawal dates. The user may go back by selecting 604, or indicate acceptance of the dates 602 by selecting 411.

Figure 7:
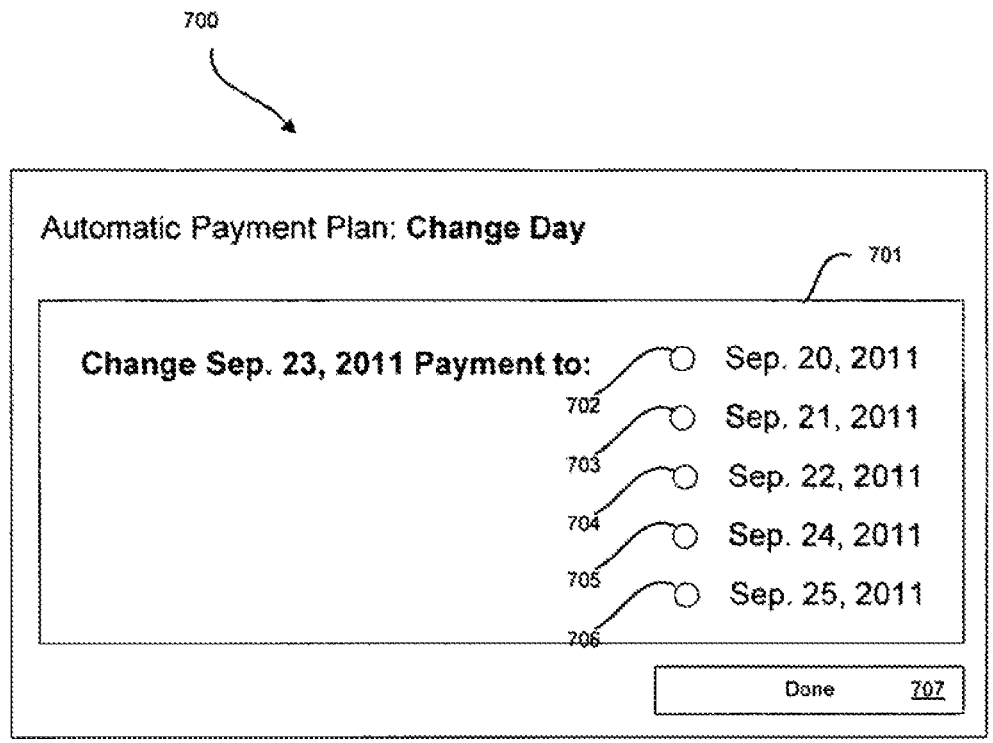
FIG. 7 illustrates an exemplary customer date entry user interface for entry of a customer-specified day of withdrawal, thereby modifying one of a plurality of precomputed recurring payment dates.

In one embodiment, each of said precomputed withdrawal dates are hyperlinked such that selection of a precomputed withdrawal date triggers transmitting fourth information such as the user interface of FIG. 7. For example, date 603 may be hyperlinked such that selection of 603 triggers transmission of 700.

FIG. 7 illustrates an exemplary customer date entry user interface 700 for entry of a customer-specified day of withdrawal, thereby modifying one of a plurality of precomputed recurring payment dates in 602. In the illustrated embodiment, additional alternate dates are suggested for the user in 701, and are selectable via 702-706. The user indicates approval of a selected date by selecting 707, which returns the customer to the user interface of FIG. 6.

FIG. 8 illustrates an exemplary user interface 800 for displaying a plurality of precomputed withdrawal dates 802 from a customer bank account in a confirmation page—confirming for the customer that the selected days are allowable. A user interface such as 800 may further comprise a signature indicator 805 indicating that the customer has officially approved the dates in 802. The dates in 802 may be hyperlinked, e.g. 803 may be hyperlinked. Insurance policy and bank account information 801 may also be advantageously displayed.

Exemplary Network Environment

Figure 9:
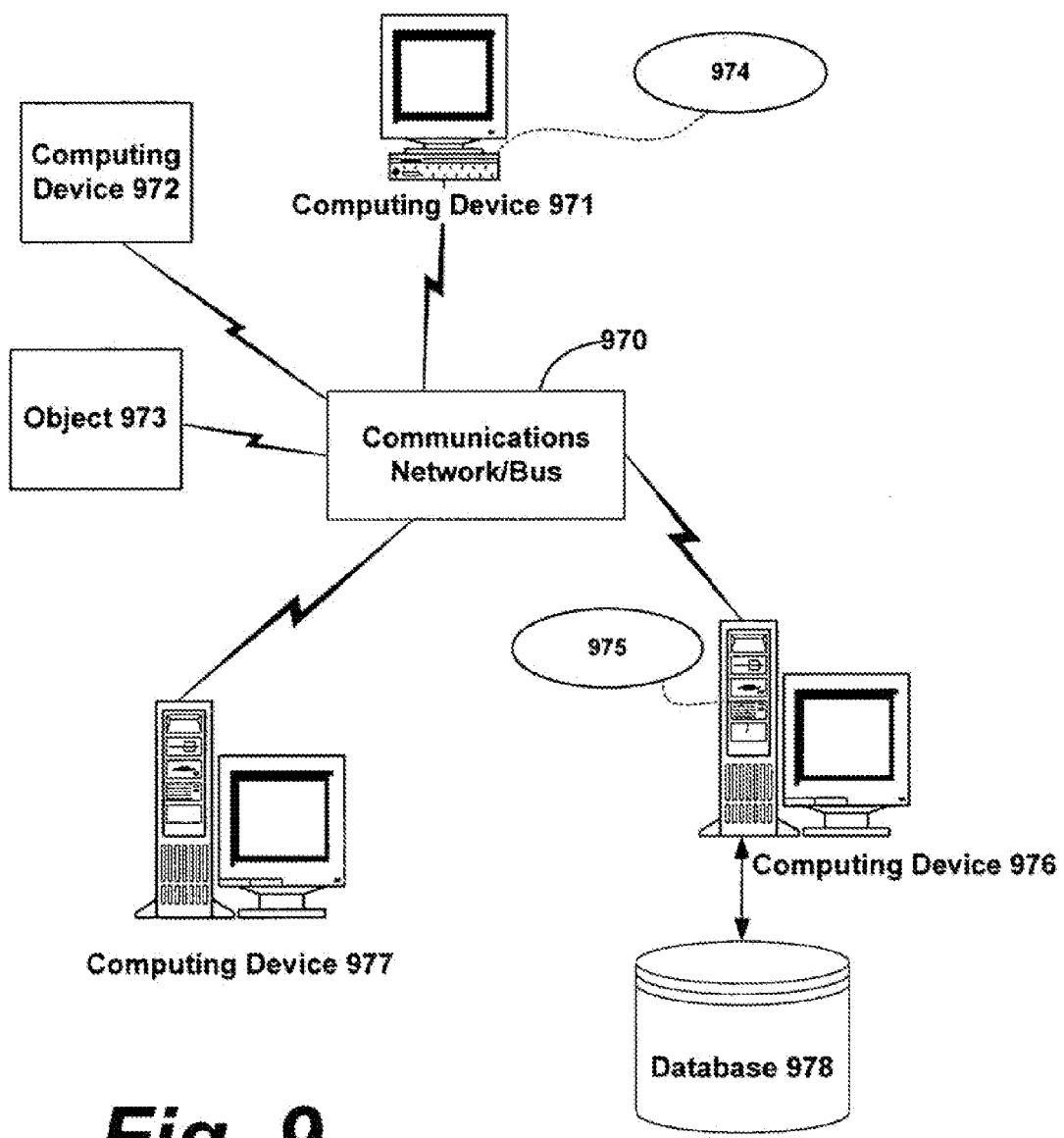
FIG. 9 illustrates an exemplary network in which embodiments of the invention may be implemented.

An exemplary networked computing environment is provided in FIG. 9. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 9 provides a schematic diagram of an exemplary networked or distributed computing environment. The environment comprises computing devices 971, 972, 976, and 977 as well as objects 973, 974, and 975, and database 978. Each of these entities 971, 972, 973, 974, 975, 976, 977 and 978 may comprise or make use of programs, methods, data stores, programmable logic, etc. The entities 971, 972, 973, 974, 975, 976, 977 and 978 may span portions of the same or different devices such as PDAs, audio/video devices, MP3 players, personal computers, etc. Each entity 971, 972, 973, 974, 975, 976, 977 and 978 can communicate with another entity 971, 972, 973, 974, 975, 976, 977 and 978 by way of the communications network 970. In this regard, any entity may be responsible for the maintenance and updating of a database 978 or other storage element.

This network 970 may itself comprise other computing entities that provide services to the system of FIG. 9, and may itself represent multiple interconnected networks. In accordance with an aspect of the invention, each entity 971, 972, 973, 974, 975, 976, 977 and 978 may contain discrete functional program modules or components that might make use of an API, or other object, software, firmware and/or hardware, to request services of one or more of the other entities 971, 972, 973, 974, 975, 976, 977 and 978.

It can also be appreciated that an object, such as 975, may be hosted on another computing device 976. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 9, any entity 971, 972, 973, 974, 975, 976, 977 and 978 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A computer-implemented method for setting a recurring automatic payment date for an insurance policy premium, comprising:
   receiving a customer request for multiple bank account withdrawals within a billing period;
   identifying by a processor at least one insurance policy associated with said customer; and
   determining by the processor whether days of the month associated with said multiple bank account withdrawals are disallowed days for receiving recurring automatic payments for said insurance policy, wherein a disallowed day is defined as:
      any day that would require a short bill in order to stay ahead of an earned premium curve associated with said insurance policy; and
      any day that would require a notice period that is shorter than a mandatory notice period for notifying a customer of a pending withdrawal from a customer bank account.

2. The method of claim 1, wherein a disallowed day is further defined as any day that would require a double bill in order to stay ahead of an earned premium curve associated with said insurance policy.

3. The method of claim 1, wherein a result of said determining is that said days of the month are not disallowed days, and further comprising updating a recurring automatic payment date associated with said customer.

4. The method of claim 3, wherein said recurring automatic payment date is a date of withdrawal of funds from a customer bank account.

5. The method of claim 1, wherein said mandatory notice period is a National Automated Clearing House Association (NACHA) mandatory notice period.

6. The method of claim 1, wherein said insurance policy comprises a plurality of insurance policies, and wherein at least one first insurance policy has a different effective date from at least one second insurance policy.

7. The method of claim 1, further comprising checking a total number of bank account withdrawals associated with a plurality of customers, and changing said days of the month to balance said total number of bank account withdrawals among a plurality of days.

8. A system for setting a recurring automatic payment date for an insurance policy premium, comprising:
   at least one subsystem configured to receive a customer request for multiple bank account withdrawals within a billing period;
   at least one subsystem configured to identify at least one insurance policy associated with said customer; and
   at least one subsystem configured to determine whether days of the month associated with said multiple bank account withdrawals are disallowed days for receiving recurring automatic payments for said insurance policy, wherein a disallowed day is defined as:
      any day that would require a short bill in order to stay ahead of an earned premium curve associated with said insurance policy; and
      any day that would require a notice period that is shorter than a mandatory notice period for notifying a customer of a pending withdrawal from a customer bank account.

9. The system of claim 8, wherein a disallowed day is further defined as any day that would require a double bill in order to stay ahead of an earned premium curve associated with said insurance policy.

10. The system of claim 8, wherein a result of subsystem configured to determine is that said days of the month are not disallowed days, and further comprising at least one subsystem configured to update a recurring automatic payment date associated with said customer.

11. The system of claim 10, wherein said recurring automatic payment date is a date of withdrawal of funds from a customer bank account.

12. The system of claim 8, wherein said mandatory notice period is a National Automated Clearing House Association (NACHA) mandatory notice period.

13. The system of claim 8, wherein said insurance policy comprises a plurality of insurance policies, and wherein at least one first insurance policy has a different effective date from at least one second insurance policy.

14. The system of claim 8, further comprising at least one subsystem configured to check a total number of bank account withdrawals associated with a plurality of customers, and to change said days of the month to balance said total number of bank account withdrawals among a plurality of days.

15. A non-transitory computer readable medium comprising instructions for setting a recurring automatic payment date for an insurance policy premium, which when executed by a computer, cause the computer to:
   receive a customer request for multiple bank account withdrawals within a billing period;
   identify at least one insurance policy associated with said customer; and
   determine whether days of the month associated with said multiple bank account withdrawals are disallowed days for receiving recurring automatic payments for said insurance policy, wherein a disallowed day is defined as:
      any day that would require a short bill in order to stay ahead of an earned premium curve associated with said insurance policy; and
      any day that would require a notice period that is shorter than a mandatory notice period for notifying a customer of a pending withdrawal from a customer bank account.

16. The non-transitory computer readable medium of claim 15, wherein a disallowed day is further defined as any day that would require a double bill in order to stay ahead of an earned premium curve associated with said insurance policy.

17. The non-transitory computer readable medium of claim 15, wherein a result of said instructions for determining is that said days of the month are not disallowed days, and further comprising instructions which when executed by the computer, cause the computer to update a recurring automatic payment date associated with said customer.

18. The non-transitory computer readable medium of claim 17, wherein said recurring automatic payment date is a date of withdrawal of funds from a customer bank account.

19. The non-transitory computer readable medium of claim 15, wherein said mandatory notice period is a National Automated Clearing House Association (NACHA) mandatory notice period.

20. The non-transitory computer readable medium of claim 15, wherein said insurance policy comprises a plurality of insurance policies, and wherein at least one first insurance policy has a different effective date from at least one second insurance policy.

21. The non-transitory computer readable medium of claim 15, further comprising instructions which when executed by the computer, cause the computer to check a total number of bank account withdrawals associated with a plurality of customers, and change said days of the month to balance said total number of bank account withdrawals among a plurality of days.

* * * * *